United States Patent
Sim

(10) Patent No.: US 10,322,642 B2
(45) Date of Patent: Jun. 18, 2019

(54) POWER SUPPLY APPARATUS FOR VEHICLE

(71) Applicant: MANDO CORPORATION, Gyeonggi-do (KR)

(72) Inventor: Gyung Hun Sim, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 15/896,070

(22) Filed: Feb. 14, 2018

(65) Prior Publication Data

US 2018/0229619 A1 Aug. 16, 2018

(30) Foreign Application Priority Data

Feb. 15, 2017 (KR) .......... 10-2017-0020493

(51) Int. Cl.
*H02P 1/00* (2006.01)
*B60L 11/18* (2006.01)
*H02J 7/00* (2006.01)
*H01M 10/42* (2006.01)

(52) U.S. Cl.
CPC ....... *B60L 11/1861* (2013.01); *B60L 11/1812* (2013.01); *H01M 10/425* (2013.01); *H02J 7/0054* (2013.01); *B60L 2240/547* (2013.01); *H01M 2010/4271* (2013.01); *Y02T 10/7005* (2013.01); *Y02T 10/705* (2013.01); *Y02T 10/7044* (2013.01); *Y02T 10/7072* (2013.01); *Y02T 90/127* (2013.01); *Y02T 90/14* (2013.01)

(58) Field of Classification Search
CPC ............................ H02J 7/0054; H01M 10/44
See application file for complete search history.

(56) References Cited

U.S. PATENT DOCUMENTS

2016/0259012 A1* 9/2016 Sejima ............... G01R 31/3651
2017/0203661 A1* 7/2017 Nishinaka ........... B60L 11/1816
2018/0164867 A1* 6/2018 Zhang ...................... G06F 1/26

\* cited by examiner

*Primary Examiner* — Karen Masih
(74) *Attorney, Agent, or Firm* — Ladas & Parry, LLP

(57) ABSTRACT

The present invention provides a power supply apparatus for a vehicle capable of supplying a stable voltage to an electronic system, and the power supply apparatus for a vehicle, which supplies power to a first electronic system and a second electronic system installed in the vehicle and includes the first electronic system including an inverter configured to drive a motor and an electronic control unit configured to control the inverter, a first battery configured to supply power to the second electronic system and the electronic control unit, a second battery configured to supply power to the inverter, and a charger configured to receive power from the first battery and charge the second battery.

18 Claims, 3 Drawing Sheets

POWER SUPPLY APPARATUS FOR VEHICLE

CROSS-REFERENCE TO RELATED APPLICATION

This application claims priority to and the benefit of Korean Patent Application No. 2017-0020493, filed on Feb. 15, 2017, the disclosure of which is incorporated herein by reference in its entirety.

BACKGROUND

1. Field of the Invention

The present invention relates to a power supply apparatus for a vehicle capable of supplying a stable voltage to an electronic system.

2. Discussion of Related Art

Generally, a plurality of electronic systems, such as a stereo, an air conditioner, a heater, and a windshield wiper, are installed in a vehicle. The electronic systems are driven by receiving power from a single vehicle battery.

Meanwhile, consumption of power of the vehicle battery tends to increase as the above-described plurality of electronic systems are electronically operated.

In particular, current consumption of a brake system, a steering system, and a suspension system among the plurality of electronic systems is higher than current consumption of other electronic systems (the stereo, the heater, the windshield wiper, and the like) of the vehicle.

When a risk is detected while the vehicle is driven, all of the brake system, the steering system, and the suspension system may be driven. In this case, current consumption of each of the electronic systems may peak.

In addition, when other electronic systems (the stereo, the heater, the windshield wiper, and the like) of the vehicle are driven together with the brake system, the steering system, and the suspension system, a voltage drop may be generated in a vehicle battery having limited capacity, and a voltage of the vehicle battery may drop to a voltage less than or equal to a voltage required for normal operation of an electronic control unit provided in the brake system, the steering system, and the suspension system.

Therefore, when there is a risk of a vehicle crash, responsiveness of the brake system, the steering system, and the suspension system may be lowered. Thus, there may be a problem in that safety of a driver cannot be ensured.

SUMMARY OF THE INVENTION

The present invention is directed to a power supply apparatus for a vehicle capable of supplying a stable voltage to an electronic system when there is a risk of a vehicle crash.

In addition, the present invention is directed to a power supply apparatus capable of preventing responsiveness of an electronic system from being lowered and ensuring safety of a driver.

Furthermore, the present invention is directed to a power supply apparatus for a vehicle capable of more surely ensuring safety of a driver when there is a risk of a vehicle crash during high-speed driving by allowing responsiveness of an electronic system during the high-speed driving of the vehicle to be faster than the responsiveness thereof during low-speed driving of the vehicle.

According to an aspect of the present invention, there is provided a power supply apparatus for a vehicle which supplies power to a first electronic system and a second electronic system installed in a vehicle and includes the first electronic system including an inverter configured to drive a motor and an electronic control unit configured to control the inverter, a first battery configured to supply power to the second electronic system and the electronic control unit, a second battery configured to supply power to the inverter, and a charger configured to receive power from the first battery and charge the second battery.

The power supply apparatus may further include a controller configured to control a charging amount and a charging rate of the second battery.

When a vehicle speed of the vehicle is greater than or equal to a first reference value and the charging amount of the second battery is less than a second reference value, the controller may control the charger to fully charge the second battery.

The first electronic system may be a brake system, a steering system, or a suspension system.

The controller may increase the charging rate of the second battery according to a vehicle speed of the vehicle.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
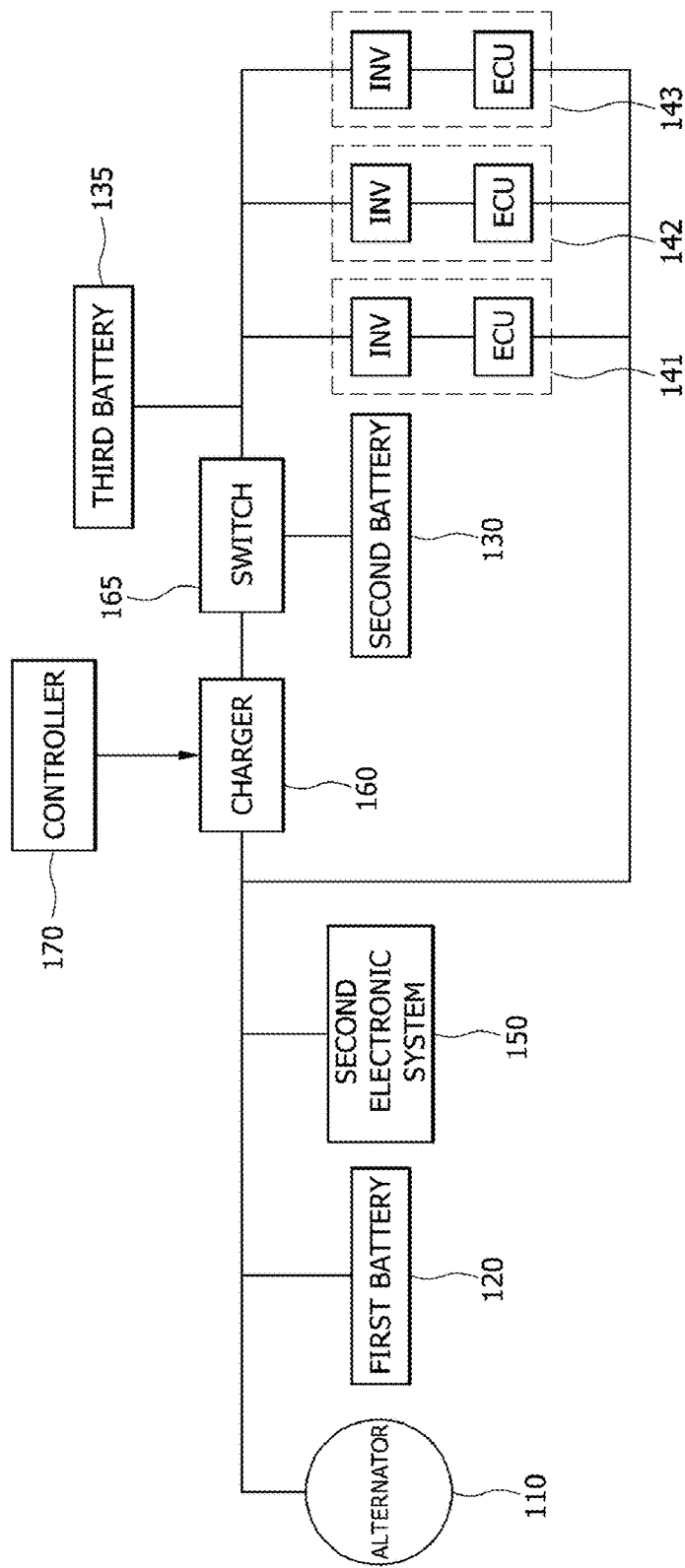
FIG. 1 is a schematic diagram illustrating a power supply apparatus for a vehicle according to an exemplary embodiment of the present invention.

Exemplary embodiments of the present invention will be described in detail with reference to the accompanying drawings such that those skilled in the art may easily achieve the present invention. However, the present invention may be achieved in various different ways and is not limited to the exemplary embodiments described herein. In the accompanying drawings, portions unrelated to the description will be omitted to clearly describe the present invention, and similar reference numerals will be used to describe similar portions throughout the present specification.

It should be understood that the terms "comprises," "comprising," "includes," and/or "including" used herein specify the presence of stated features, integers, steps, operations, elements, components, and/or combinations thereof, but do not preclude the presence or addition of one or more other features, integers, steps, operations, elements, components, and/or combinations thereof.

FIG. 1 is a schematic diagram illustrating a power supply apparatus 100 for a vehicle according to an exemplary embodiment of the present invention.

As shown in FIG. 1, the power supply apparatus 100 for a vehicle according to the exemplary embodiment of the present invention is configured to supply power to a first electronic system 140 and a second electronic system 150 installed in a vehicle, and includes the first electronic system 140, a first battery 120, a second battery 130, and a charger 160.

Here, the first electronic system 140 may be a brake system 141, a steering system 142, or a suspension system 143 installed in the vehicle to control movement of the vehicle. The second electronic system 150 may be a stereo, an air conditioner, a heater, or a windshield wiper installed in the vehicle for convenience of a driver.

In particular, the first electronic system 140, i.e., each of the brake system 141, the steering system 142, and the suspension system 143, is an electronic system essentially required to avoid a risk of a vehicle crash when there is the risk of a vehicle crash.

Specifically, the brake system 141 decelerates or stops the vehicle, the steering system 142 turns the vehicle, and the suspension system 143 controls an attitude of the vehicle, thereby ensuring safety of a driver by avoiding a risk of a vehicle crash when there is the risk of a vehicle crash.

Here, the suspension system 143 may be installed at each of a front wheel and a rear wheel of the vehicle. Each of the brake system 141, the steering system 142, and the suspension system 143 may be electronically driven.

In addition, the first battery 120 is connected in parallel to the second electronic system 150, and the second battery 130 is connected in parallel to the first electronic system 140, i.e., each of the brake system 141, the steering system 142, and the suspension system 143.

Hereinafter, a case in which all of the brake system 141, the steering system 142, and the suspension system 143 are electronically driven will be described as an example, but the present invention is not limited thereto.

As shown in FIG. 1, each of the brake system 141, the steering system 142, and the suspension system 143 may include an inverter INV for driving a motor and an electronic control unit (ECU) for controlling the inverter INV.

Meanwhile, since it is necessary to drive the motor, current consumption of the brake system 141, the steering system 142, and the suspension system 143 is higher than current consumption of the second electronic system 150. Since it is necessary to control driving of the motor, current consumption of the inverter INV is higher than current consumption of the ECU which merely supplies a control signal to the inverter INV.

Specifically, the brake system 141 may consume a maximum current of 100 $A_{rms}$. The steering system 142 may consume a maximum current of 95 $A_{rms}$. The suspension systems 143 installed in the front wheel and the rear wheel may consume a maximum current of 100 $A_{rms}$ and a maximum current of 80 $A_{rms}$.

The first battery 120 is charged by receiving power generated by an alternator 110 while the vehicle is driven. The first battery 120 supplies power to each of the ECUs of the first electronic system 140 and the second electronic system 50.

The second battery 130 is charged by receiving power charged in the first battery 120. The second battery 130 supplies power to the inverter INV of the first electronic system 140.

That is, the second electronic system 150 receives power from a single battery, i.e., the first battery 120, whereas the first electronic system 140 is divided into the ECU and the inverter INV, and the ECU and the inverter INV receive power from separate batteries, i.e., the first battery 120 and the second battery 130.

Meanwhile, since the second battery 130 supplies power to the inverter INV having relatively high current consumption and the first battery 120 supplies power to each of the second electronic system 150 and the ECU having relatively low current consumption, it is desirable for a level of a voltage charged in the second battery 130 to be higher than a level of a voltage charged in the first battery 120.

Here, since current consumption of the ECU of the first electronic system 140 is lower than current consumption of the inverter INV of the first electronic system 140, although the current consumption is increased due to the second electronic system 150 being driven such that a voltage drop is generated in the first battery 120, an effect of the voltage drop is small. Accordingly, a consumed current required to drive the ECU of the first electronic system 140 can be supplied from the first battery 120.

Since the inverter INV of the first electronic system 140 receives power from the second battery 130 charged and discharged independently from the first battery 120, although the current consumption is increased due to the second electronic system 150 being driven such that a voltage drop is generated in the first battery 120, the voltage drop has no effect. Accordingly, a consumed current required to drive the inverter INV of the first electronic system 140 can be supplied from the second battery 130.

Therefore, although the current consumption is increased due to the second electronic system 150 being driven such that a voltage of the first battery 120 drops, a stable voltage can be supplied to the first electronic system 140 to prevent responsiveness of the first electronic system 140 from being lowered.

That is, the first electronic system 140, i.e., all of the brake system 141, the steering system 142, and the suspension system 143, can be normally operated when there is a risk of a vehicle crash, thereby ensuring safety of a driver.

The charger 160 is connected between the first battery 120 and the second battery 130 and receives alternating current (AC) power from the first battery 120 to charge the second battery 130.

The power supply apparatus 100 for a vehicle according to the exemplary embodiment of the present invention may further include a controller 170 for controlling a charging amount and a charging rate of the second battery 130.

On the other hand, since the responsiveness of the first electronic system 140 during high-speed driving of the vehicle is faster than the responsiveness thereof during low-speed driving of the vehicle, the charging amount and the charging rate of the second battery 130 during the high-speed driving need to be controlled differently from those during the low-speed driving.

Specifically, when a vehicle speed of the vehicle is greater than or equal to a preset first reference value and the charging amount of the second battery 130 is less than a preset second reference value, the controller 170 controls the charger 160 to fully charge the second battery 130 at a first charging rate.

Here, the first reference value may be a vehicle speed at which fast responsiveness of the first electronic system 140 is required. The second reference value may be a charging amount of the second battery 130, capable of sufficiently supplying a consumed current required to normally drive the first electronic system 140 during high-speed driving, i.e., when a vehicle speed is greater than or equal to the first reference value. The first charging rate may be a rate faster than a charging rate when the vehicle speed of the vehicle is less than the first reference value.

The first reference value, the second reference value, and the first charging rate may be preset and stored in a storage (not shown) included in the ECU.

In addition, the controller 170 may increase the charging rate of the second battery 130 according to the vehicle speed of the vehicle.

Therefore, the responsiveness of the first electronic system 140 during high-speed driving of the vehicle can be faster than the responsiveness thereof during low-speed driving of the vehicle such that safety of a driver is more surely ensured when there is a risk of a vehicle crash during the high-speed driving.

The power supply apparatus 100 for a vehicle according to the exemplary embodiment of the present invention may further include a third battery 135 supplying power to the inverter INV and a switch 165 connecting at least one of the second battery 130 and the third battery 135 to the charger 160.

In this case, the controller 170 may control the switch 165 to connect the second battery 130 and the charger 160 or connect the third battery 135 and the charger 160.

In addition, the controller 170 may control the switch 165 to connect the charger 160 and one battery having a smaller charging amount among the second battery 130 and the third battery 135.

Specifically, when the second battery 130 is fully charged, the controller 170 releases the connection between the second battery 130 and the charger 160 and connects the second battery 130 and the inverter INV to discharge the second battery 130. The controller 170 connects the third battery 135 and the charger 160 to charge the third battery 135.

When the third battery 135 is fully charged, the controller 170 releases the connection between the third battery 135 and the charger 160 and connects the third battery 135 and the inverter INV to discharge the third battery 135. The controller 170 connects the second battery 130 and the charger 160 to charge the second battery 130.

Stable power can be continuously supplied to the inverter INV by repeating such a process.

In addition, when the charging amount of the second battery 130 is less than a third reference value, the controller 170 may connect the third battery 135 and the inverter INV.

Here, the third battery 135 may have a charging capacity smaller than a charging capacity of the second battery 130.

Specifically, the third battery 135 functions as an auxiliary battery of the second battery 130, and when the second battery 130 cannot solely supply power in a range of normal operation of the inverter INV, the controller 170 may connect the third battery 135 to the inverter INV. Accordingly, the second battery 130 and the third battery 135 may cooperate to supply stable power to the inverter INV.

Figure 2:
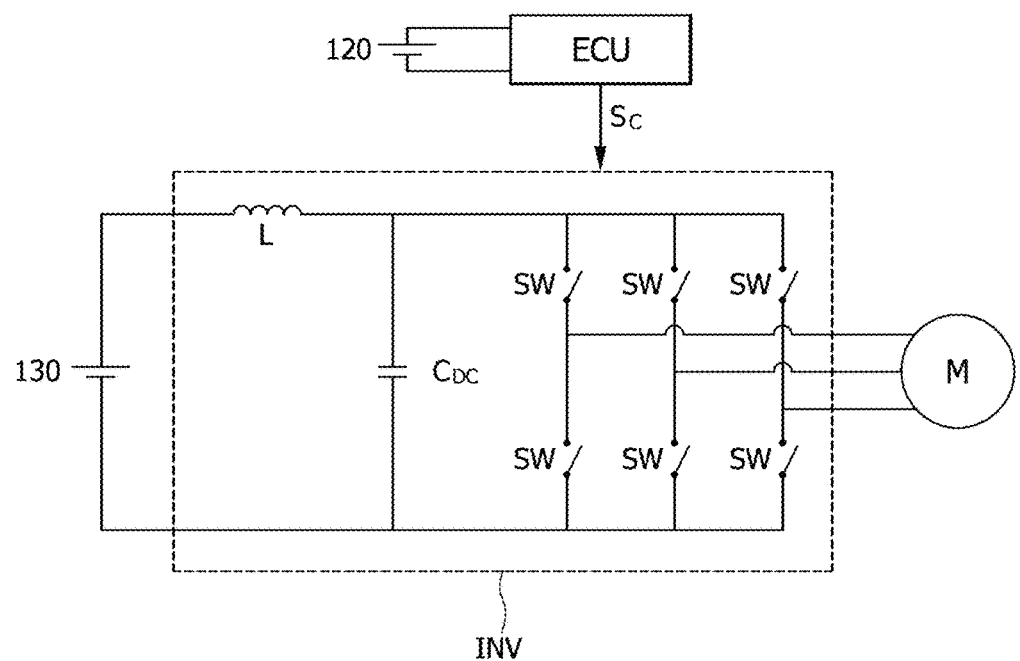
FIG. 2 is a schematic diagram illustrating a first electronic system according to an exemplary embodiment of the present invention.

FIG. 2 is a schematic diagram illustrating the first electronic system 140 according to the exemplary embodiment of the present invention.

As shown in FIG. 2, the first electronic system 140 includes a motor M, the inverter INV for driving the motor M, and the ECU for controlling the inverter INV.

The inverter INV converts direct current (DC) power supplied from the second battery 130 into AC power and supplies the AC power to the motor M.

Specifically, the inverter INV may include a plurality of switches SW converting the DC power supplied from the second battery 130 into the AC power, a DC-link capacitor $C_{DC}$ for preventing an instantaneous voltage drop of the plurality of switches SW, and an inductor L for smoothing power of the second battery 130. The inverter INV controls an on/off duty ratio of each of the plurality of the switches SW to convert the DC power into the AC power.

In this case, the switch SW may be a semiconductor switch, and may be controlled in a pulse width modulation (PWM) manner according to a PWM signal.

The ECU receives DC power from the first battery 120 and supplies a control signal Sc for driving the inverter INV to the inverter INV.

Here, since current consumption of the ECU of the first electronic system 140 is lower than current consumption of the inverter INV, although the current consumption is increased due to the second electronic system 150 being driven such that a voltage drop is generated in the first battery 120, an effect of the voltage drop is small. Accordingly, a consumed current required to drive the ECU of the first electronic system 140 can be supplied from the first battery 120.

Since the inverter INV of the first electronic system 140 receives power from the second battery 130 charged and discharged independently from the first battery 120, although the current consumption is increased due to the second electronic system 150 being driven such that a voltage drop is generated in the first battery 120, the voltage drop has no effect. Accordingly, a consumed current required to drive the inverter INV of the first electronic system 140 can be supplied from the second battery 130.

Therefore, although the current consumption is increased due to the second electronic system 150 being driven such that the voltage of the first battery 120 drops, a stable voltage can be supplied to the first electronic system 140, thereby preventing responsiveness of the first electronic system 140 from being lowered.

That is, the first electronic system 140, i.e., all of the brake system 141, the steering system 142, and the suspension system 143, can be normally operated when there is a risk of a vehicle crash, thereby ensuring safety of a driver.

Figure 3:
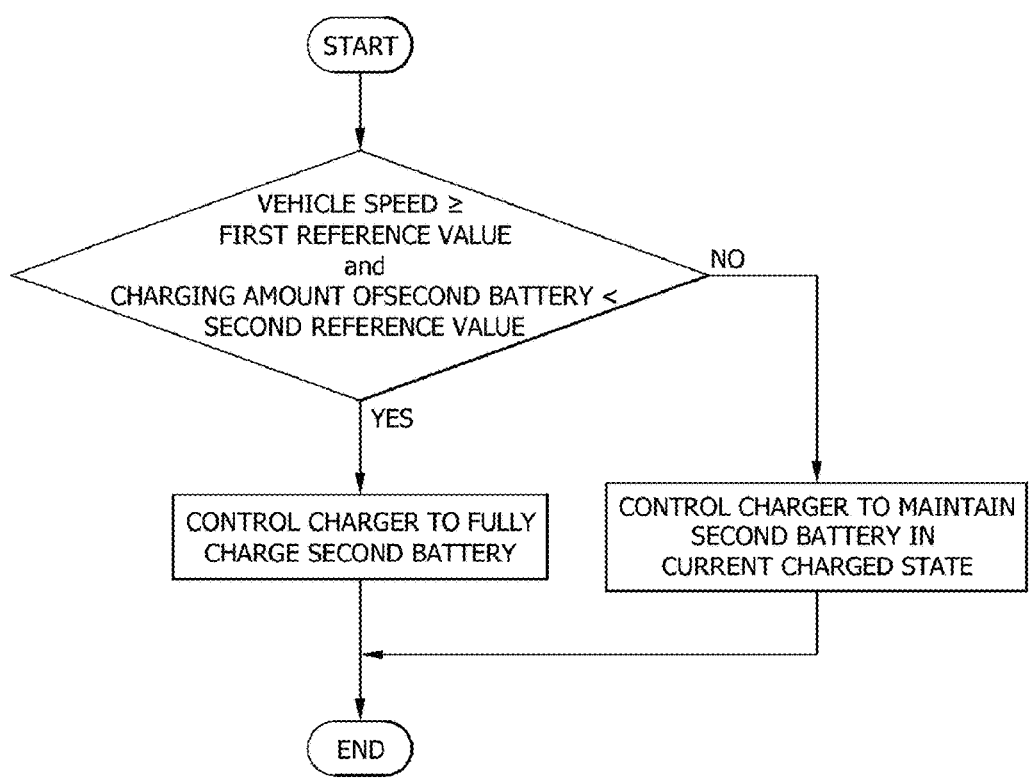
FIG. 3 is a flowchart of a method by which a controller controls a charger according to an exemplary embodiment of the present invention.

FIG. 3 is a flowchart of a method by which the controller 170 controls the charger 160 according to an exemplary embodiment of the present invention.

As shown in FIG. 3, the method by which the controller 170 controls the charger 160 according to the exemplary embodiment of the present invention includes determining whether a vehicle speed of a vehicle is greater than or equal to a preset first reference value and a charging amount of the second battery 130 is less than a preset second reference value.

In this case, when the vehicle speed of the vehicle is greater than or equal to the preset first reference value and the charging amount of the second battery 130 is less than the preset second reference value, the controller 170 controls the charger 160 to fully charge the second battery 130 at a first charging rate.

When the vehicle speed of the vehicle is less than the preset first reference value and the charging amount of the second battery 130 is greater than or equal to the preset second reference value, the controller 170 controls the charger 160 to maintain the second battery 130 in a current charged state.

Here, the first reference value may be a vehicle speed at which fast responsiveness of the first electronic system 140 is required. The second reference value may be a charging amount of the second battery 130 capable of sufficiently supplying a consumed current required to normally drive the first electronic system 140 during high-speed driving, i.e., when the vehicle speed is greater than or equal to the first reference value. The first charging rate may be a rate faster than a charging rate when the vehicle speed of the vehicle is less than the first reference value.

The first reference value, the second reference value, and the first charging rate may be preset and stored in a storage (not shown) included in an ECU.

In addition, the controller 170 may increase a charging rate of the second battery 130 according to the vehicle speed of the vehicle.

Therefore, responsiveness of the first electronic system 140 during high-speed driving of the vehicle can be faster than the responsiveness thereof during low-speed driving of the vehicle such that safety of a driver can be more surely ensured when there is a risk of a vehicle crash during the high-speed driving.

According to the present invention, when there is a risk of a vehicle crash, a stable voltage can be supplied to an electronic system.

In addition, according to the present invention, responsiveness of an electronic system can be prevented from being lowered and stability of a driver can be ensured.

Furthermore, according to the present invention, responsiveness of an electronic system during high-speed driving of a vehicle can be faster than the responsiveness thereof during low-speed driving of the vehicle such that safety of a driver can be more surely ensured when there is a risk of a vehicle crash during the high-speed driving.

While the present invention has been described in connection with what is presently considered to be practical exemplary embodiments, it should be understood that the present invention is not limited to the disclosed embodiments, and the present invention is intended to cover various modifications and equivalent arrangements included within the spirit and scope of the appended claims.

What is claimed is:

1. A power supply apparatus for a vehicle which supplies power to a first electronic system and a second electronic system installed in a vehicle, the power supply apparatus comprising:
   the first electronic system comprising an inverter configured to drive a motor and an electronic control unit configured to control the inverter;
   a first battery configured to supply power to the second electronic system and the electronic control unit;
   a second battery configured to supply power to the inverter;
   a charger configured to receive power from the first battery and charge the second battery; and
   a controller configured to control a charging amount and a charging rate of the second battery.

2. The power supply apparatus of claim 1, wherein, when a vehicle speed of the vehicle is greater than or equal to a first reference value and the charging amount of the second battery is less than a second reference value, the controller controls the charger to fully charge the second battery.

3. The power supply apparatus of claim 1, wherein the first electronic system is a brake system, a steering system, or a suspension system.

4. The power supply apparatus of claim 1, wherein current consumption of the electronic control unit is lower than current consumption of the inverter.

5. The power supply apparatus of claim 1, wherein the controller increases the charging rate of the second battery according to a vehicle speed of the vehicle.

6. The power supply apparatus of claim 1, further comprising:
   a third battery configured to supply power to the inverter; and
   a switch connecting at least one of the second battery and the third battery to the charger.

7. The power supply apparatus of claim 6, wherein the controller controls the switch to connect the second battery and the charger or connect the third battery and the charger.

8. The power supply apparatus of claim 6, wherein the controller controls the switch to connect the charger and one battery having a smaller charging amount among the second battery and the third battery.

9. The power supply apparatus of claim 6, wherein, when the charging amount of the second battery is less than a third reference value, the controller connects the third battery and the inverter.

10. A power supply apparatus for a vehicle which supplies power to a first electronic system and a second electronic system installed in a vehicle, the power supply apparatus comprising:
    the first electronic system comprising an inverter configured to drive a motor and an electronic control unit configured to control the inverter;
    a first battery configured to supply power to the second electronic system and the electronic control unit;
    a second battery configured to supply power to the inverter; and
    a charger configured to receive power from the first battery and charge the second battery,
    wherein current consumption of the electronic control unit is lower than current consumption of the inverter.

11. The power supply apparatus of claim 10, further comprising a controller configured to control a charging amount and a charging rate of the second battery.

12. The power supply apparatus of claim 11, wherein, when a vehicle speed of the vehicle is greater than or equal to a first reference value and the charging amount of the second battery is less than a second reference value, the controller controls the charger to fully charge the second battery.

13. The power supply apparatus of claim 10, wherein the first electronic system is a brake system, a steering system, or a suspension system.

14. The power supply apparatus of claim 11, wherein the controller increases the charging rate of the second battery according to a vehicle speed of the vehicle.

15. The power supply apparatus of claim 11, further comprising:
    a third battery configured to supply power to the inverter; and
    a switch connecting at least one of the second battery and the third battery to the charger.

16. The power supply apparatus of claim 15, wherein the controller controls the switch to connect the second battery and the charger or connect the third battery and the charger.

17. The power supply apparatus of claim 15, wherein the controller controls the switch to connect the charger and one battery having a smaller charging amount among the second battery and the third battery.

18. The power supply apparatus of claim 15, wherein, when the charging amount of the second battery is less than a third reference value, the controller connects the third battery and the inverter.

* * * * *